(12) United States Patent
Kano

(10) Patent No.: US 10,248,246 B2
(45) Date of Patent: Apr. 2, 2019

(54) PIEZOELECTRIC SENSOR AND TOUCH PANEL

(71) Applicant: Murata Manufacturing Co., Ltd., Nagaokakyo-shi, Kyoto-fu (JP)

(72) Inventor: Hidekazu Kano, Nagaokakyo (JP)

(73) Assignee: MURATA MANUFACTURING CO., LTD., Nagaokako-Shi, Kyoto-Fu (JP)

( * ) Notice: Subject to any disclaimer, the term of this patent is extended or adjusted under 35 U.S.C. 154(b) by 155 days.

(21) Appl. No.: 15/190,488

(22) Filed: Jun. 23, 2016

(65) Prior Publication Data

US 2016/0299625 A1    Oct. 13, 2016

Related U.S. Application Data

(63) Continuation of application No. PCT/JP2014/083655, filed on Dec. 19, 2014.

(30) Foreign Application Priority Data

Dec. 27, 2013  (JP) .................................. 2013-273016

(51) Int. Cl.
*G06F 3/041* (2006.01)
*G06F 3/044* (2006.01)
*G01L 1/16* (2006.01)

(52) U.S. Cl.
CPC .............. *G06F 3/0416* (2013.01); *G01L 1/16* (2013.01); *G06F 3/044* (2013.01); *G06F 3/0414* (2013.01);
(Continued)

(58) Field of Classification Search
CPC ................. G06F 3/0416; G06F 3/0414; G06F 2203/04103; G06F 2203/04105; G01L 1/16

See application file for complete search history.

(56) References Cited

U.S. PATENT DOCUMENTS 9,128,553 B2    9/2015  Andoh
9,134,826 B2    9/2015  Andoh
(Continued)

FOREIGN PATENT DOCUMENTS

JP    WO 2013161784 A1 * 10/2013  .......... G06F 3/0354
WO   WO 2010143528 A1    12/2010
(Continued)

OTHER PUBLICATIONS

International Search Report issued for PCT/JP2014/083655, dated Mar. 31, 2015.
(Continued)

*Primary Examiner* — Robert J Michaud
(74) *Attorney, Agent, or Firm* — Arent Fox LLP

(57) ABSTRACT

A capacitive sensor that includes a plurality of capacitance detection electrodes, an insulating substrate, a plurality of capacitance detection electrodes and an insulating substrate. A piezoelectric sensor includes a press detection electrode, a piezoelectric film, a plurality of press detection electrodes and an insulating substrate. The piezoelectric film includes a top surface on which the press detection electrode and wires are formed. The insulating substrate includes a top surface on which the plurality of press detection electrodes and wires are formed. The piezoelectric film includes a cutout portion through which part of the wires of the insulating substrate are exposed. A normal direction of an inner corner of the cutout portion of the piezoelectric film does not match with a uniaxial stretching direction of the piezoelectric film.

20 Claims, 18 Drawing Sheets

(52) U.S. Cl.
CPC .............. *G06F 2203/04102* (2013.01); *G06F 2203/04103* (2013.01); *G06F 2203/04105* (2013.01)

(56) References Cited

U.S. PATENT DOCUMENTS

| | | |
|---|---|---|
| 9,383,884 B2 | 7/2016 | Ando |
| 2004/0244167 A1* | 12/2004 | Kitagawa ............. B41J 2/14233 29/25.35 |
| 2010/0253183 A1* | 10/2010 | Ando ........................ G01L 1/16 310/338 |
| 2012/0075226 A1 | 3/2012 | Andoh |
| 2013/0328817 A1 | 12/2013 | Andoh |
| 2014/0347578 A1* | 11/2014 | Yamada .................. G06F 3/044 349/12 |
| 2015/0042590 A1 | 2/2015 | Ando et al. |
| 2015/0153880 A1 | 6/2015 | Ando |
| 2016/0034073 A1 | 2/2016 | Andoh |

FOREIGN PATENT DOCUMENTS

| | | |
|---|---|---|
| WO | WO 2013073460 A1 | 5/2013 |
| WO | WO 2013161784 A1 | 10/2013 |

OTHER PUBLICATIONS

Written Opinion of the International Seaching Authority issued for PCT/JP2014/083655, dated Mar. 31, 2015.

\* cited by examiner

PIEZOELECTRIC SENSOR AND TOUCH PANEL

CROSS REFERENCE TO RELATED APPLICATIONS

The present application is a continuation of International application No. PCT/JP2014/083655, filed Dec. 19, 2014, which claims priority to Japanese Patent Application No. 2013-273016, filed Dec. 27, 2013, the entire contents of each of which are incorporated herein by reference.

FIELD OF THE INVENTION

The present invention relates to a piezoelectric sensor which detects a pressing operation, a bending operation, a twisting operation and the like, and a touch panel which includes the piezoelectric sensor.

BACKGROUND OF THE INVENTION

Conventionally, various piezoelectric sensors which each detect a press on an operation surface and various touch panels which each include a piezoelectric sensor have been devised. For example, Patent Literature 1 discloses a touch panel which can simultaneously receive inputs of position information on a top surface of the touch panel and press information.

This touch panel includes a piezoelectric film and a detecting unit. The piezoelectric film is uniaxially stretched, and molecules are oriented in a uniaxial stretching direction. The piezoelectric film includes a first principal surface on which electrodes and connection wires are formed, and a second principal surface which opposes the first principal surface. The electrodes formed on the first principal surface of the piezoelectric film are connected to the detecting unit via the connection wires.

According to this configuration, the detecting unit detects a voltage produced in each electrode when a force is applied to a top surface of the touch panel. Thus, the detecting unit detects that the top surface of the touch panel has been pressed.

PTL 1: International Publication No. 2010/143528

SUMMARY OF THE INVENTION

The touch panel includes electrodes in, for example, the second principal surface of the piezoelectric film, and therefore needs to include a substrate with a third principal surface on which electrodes and connection wires are formed attached to the second principal surface of the piezoelectric film and a fourth principal surface opposing the third principal surface. Further, the piezoelectric film includes a cutout portion through which part of the connection wires formed on the substrate are exposed.

In the touch panel adopting this structure, all connection wires of the piezoelectric film and the substrate are directed to an identical direction, so that there is an advantage that it is possible to establish connection with the detecting unit as single-side contact.

However, there is an obvious problem that, when the cutout portion is provided to the piezoelectric film, a crack is produced from an inner corner of a rim located near the cutout portion of the piezoelectric film to a uniaxial stretching direction of the piezoelectric film.

Hence, in conventional piezoelectric sensors, there is a concern that a crack will break a piezoelectric film or disconnect electrodes or connection wires.

It is therefore an object of the present invention to provide a piezoelectric sensor and a touch panel which prevent a crack from being produced in a piezoelectric film.

A piezoelectric sensor according to one aspect of the present invention includes a piezoelectric film and a substrate. The piezoelectric film includes a first principal surface and a second principal surface opposing the first principal surface, and includes a first conductor pattern formed on the first principal surface. Further, the piezoelectric film is uniaxially stretched.

The substrate includes a third principal surface attached to the second principal surface of the piezoelectric film, and a fourth principal surface opposing the third principal surface, and includes a second conductor pattern formed on the third principal surface. The piezoelectric film includes a cutout portion through which part of the second conductor pattern is exposed.

A normal direction of an inner corner of a rim located near the cutout portion of the piezoelectric film does not match with a uniaxial stretching direction of the piezoelectric film. Alternatively, a tangential direction of the inner corner of the rim located near the cutout portion of the piezoelectric film does not match with a direction in which the piezoelectric film experiences the greatest shrinkage when heated.

According to this configuration, a direction in which the piezoelectric film is readily broken or a direction in which a crack is readily produced is different from the normal direction of the inner corner of the rim located near the cutout portion of the piezoelectric film.

Consequently, according to this configuration, it is possible to prevent a crack from being produced in the piezoelectric film.

Further, preferably, in the piezoelectric sensor according to the present invention, the inner corner has a radiused shape.

According to this configuration, a stress to be applied to the inner corner is alleviated compared to a case where the inner corner has a right-angle shape.

Further, preferably, in the piezoelectric sensor according to the present invention, the inner corner has a polygonal shape, and an interior angle of each vertex of the inner corner is an obtuse angle.

According to this configuration, a stress to be applied to the inner corner is alleviated compared to a case where the inner corner has a right-angle shape.

Further, preferably, in the piezoelectric sensor according to the present invention, the piezoelectric film is made of a chiral polymer.

According to this configuration, it is possible to reliably detect a signal level of a detection signal with a high sensitivity.

Further, preferably, according to the piezoelectric sensor according to the present invention, the chiral polymer is polylactic acid.

According to this configuration, it is possible to reliably detect a signal level of a detection signal with a high sensitivity.

Further, preferably, according to the piezoelectric sensor according to the present invention, the polylactic acid is poly-L-lactic acid.

According to this configuration, it is possible to reliably detect a signal level of a detection signal with a high sensitivity.

A touch panel according to the present invention includes: the piezoelectric sensor according to the present invention; and a touch sensor which is attached to the piezoelectric sensor according to the present invention and detects an operation position on an operation surface.

Consequently, the touch panel according to the present invention provides the same effect as that of the piezoelectric sensor according to the present invention.

According to the present invention, it is possible to prevent a crack from being produced in the piezoelectric film.

DETAILED DESCRIPTION OF THE INVENTION

A touch panel according to the embodiment of the present invention will be described with reference to the drawings.

Figure 1:
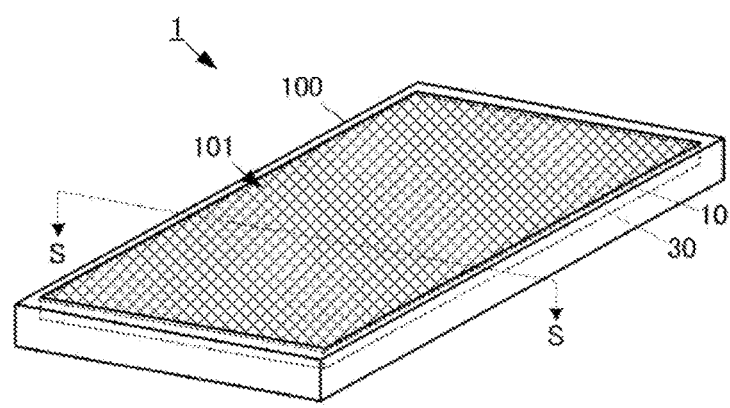
FIG. 1 is an external appearance perspective view of a display device 1 which includes a touch panel 10 according to an embodiment of the present invention.
Figure 2:
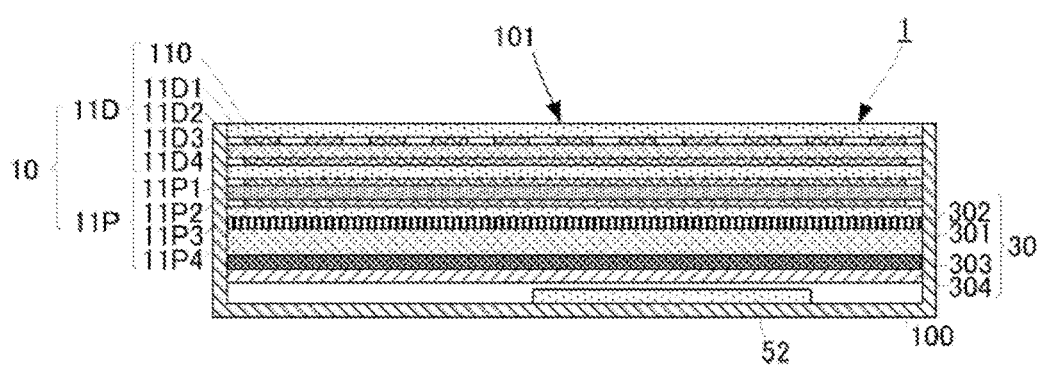
FIG. 2 is a sectional view taken along a line S-S illustrated in FIG. 1.
Figure 3:
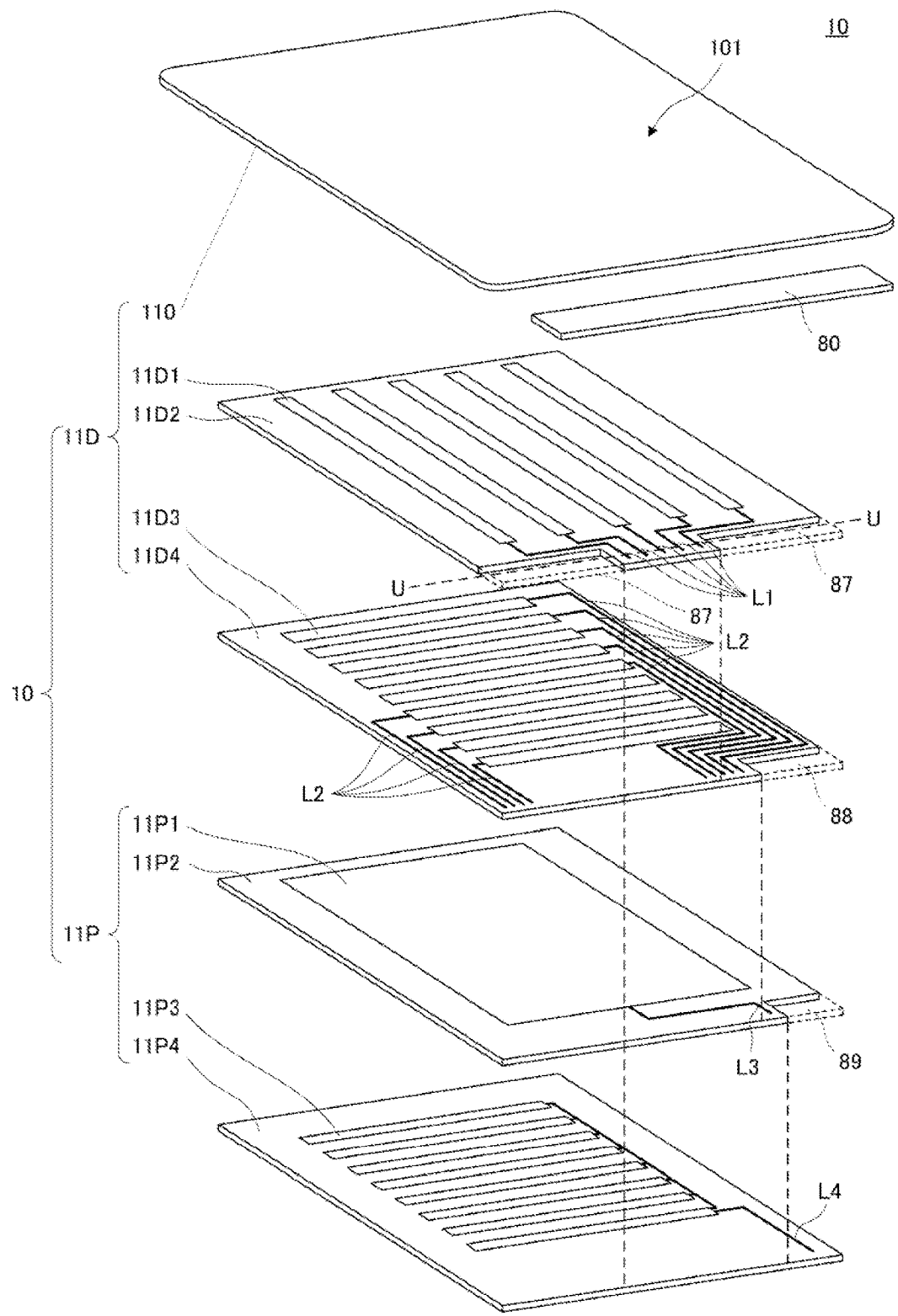
FIG. 3 is an exploded perspective view of the touch panel 10 illustrated in FIG. 2.
Figure 4:
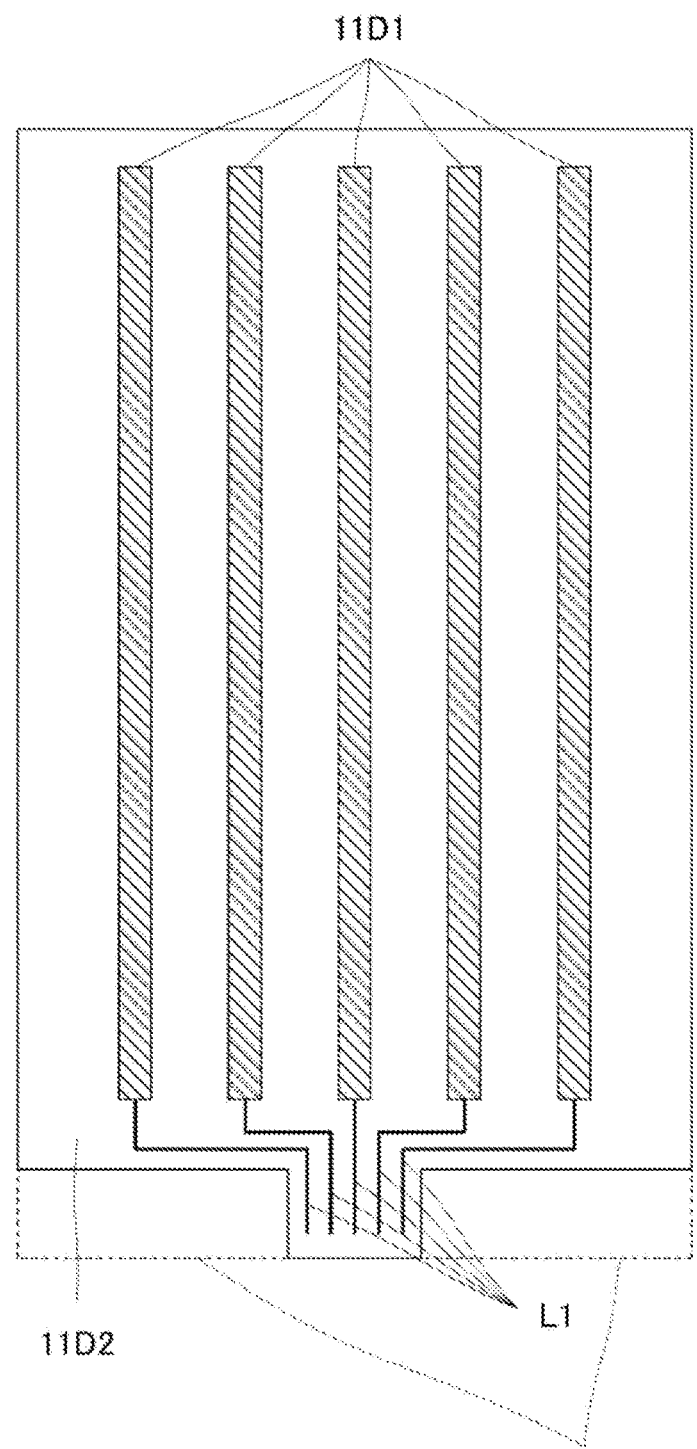
FIG. 4 is a plan view of an insulating substrate 11D2 illustrated in FIG. 2.
Figure 5:
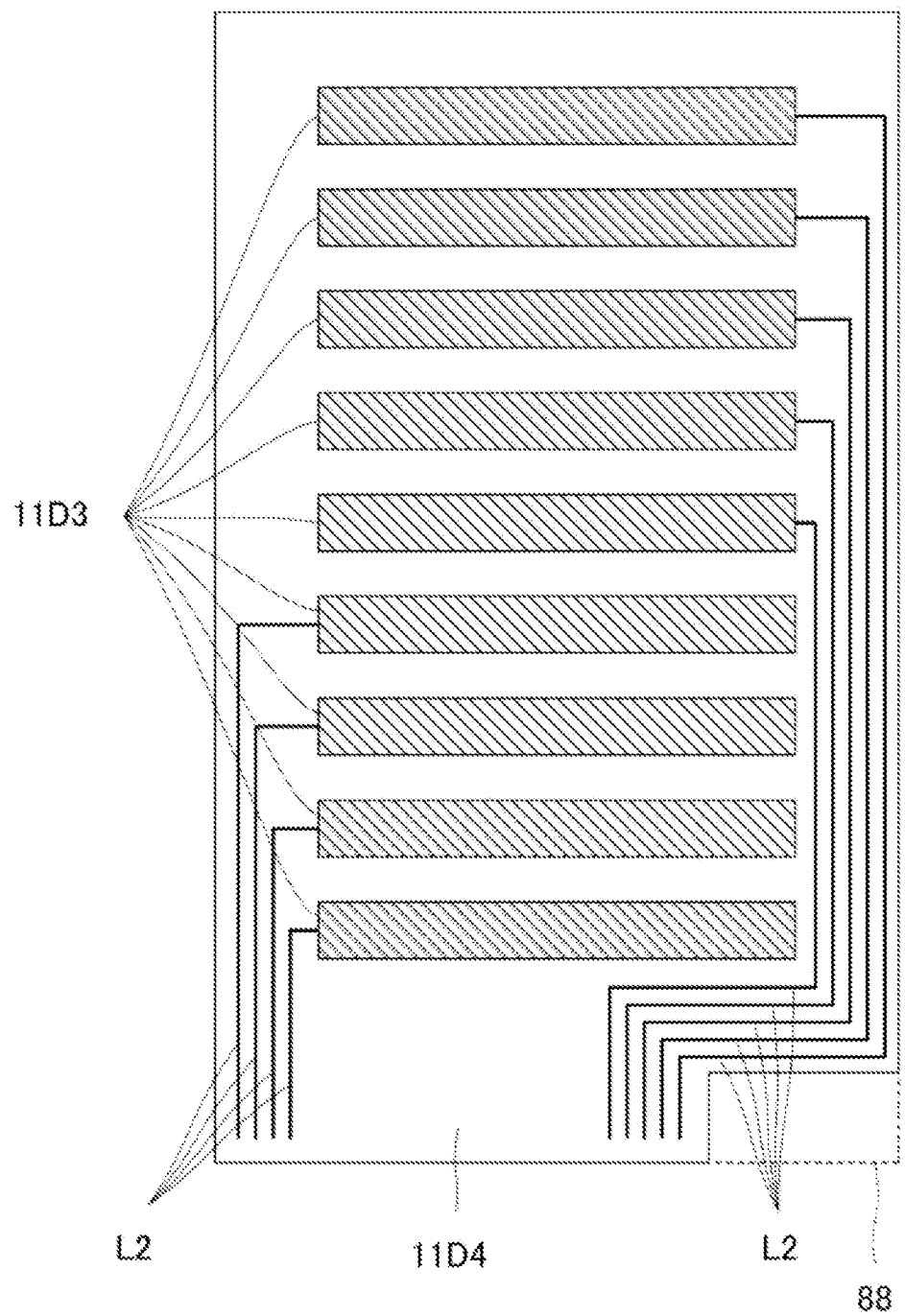
FIG. 5 is a plan view of an insulating substrate 11D4 illustrated in FIG. 2.
Figure 6:
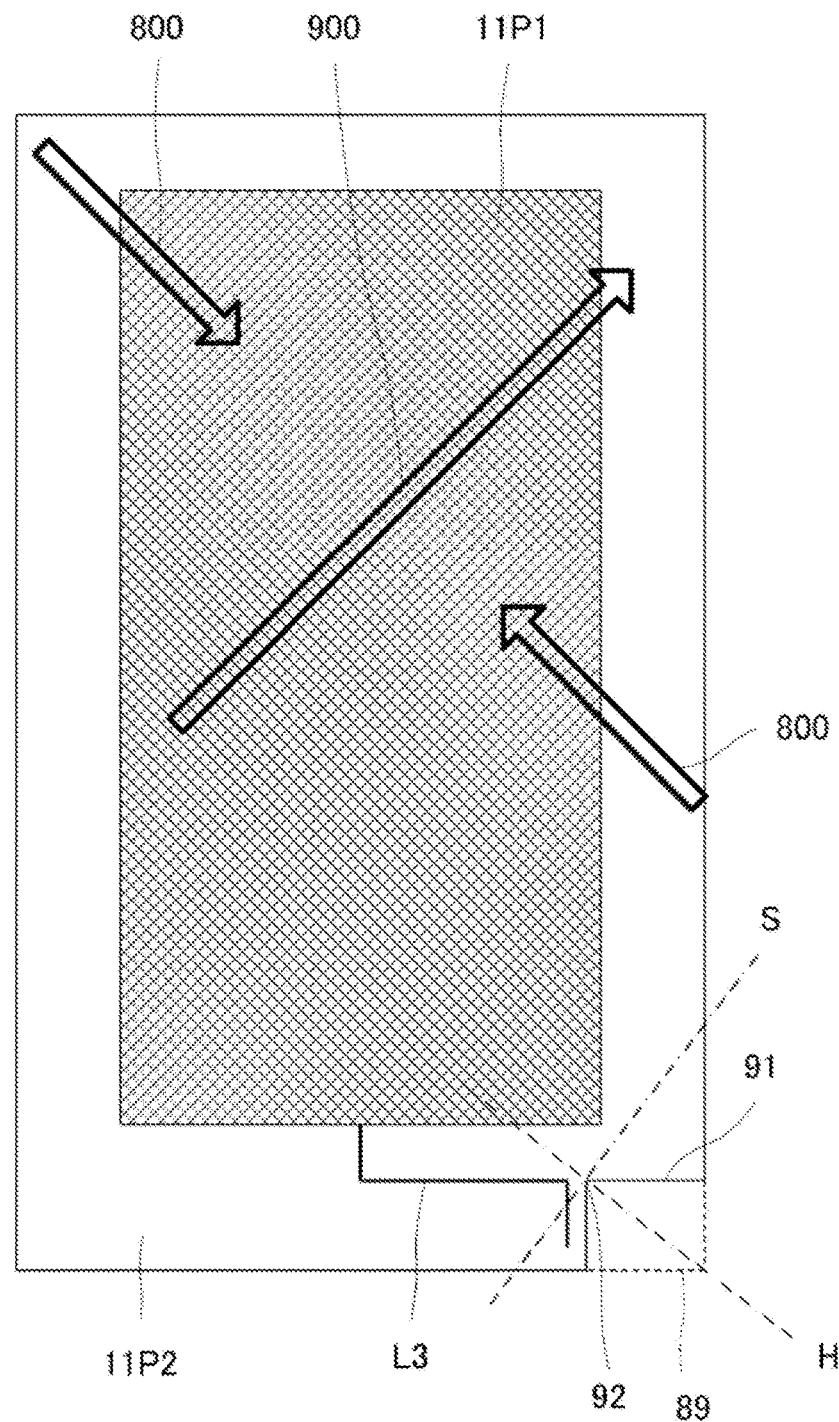
FIG. 6 is a plan view of a piezoelectric film 11P2 illustrated in FIG. 2.
Figure 7:
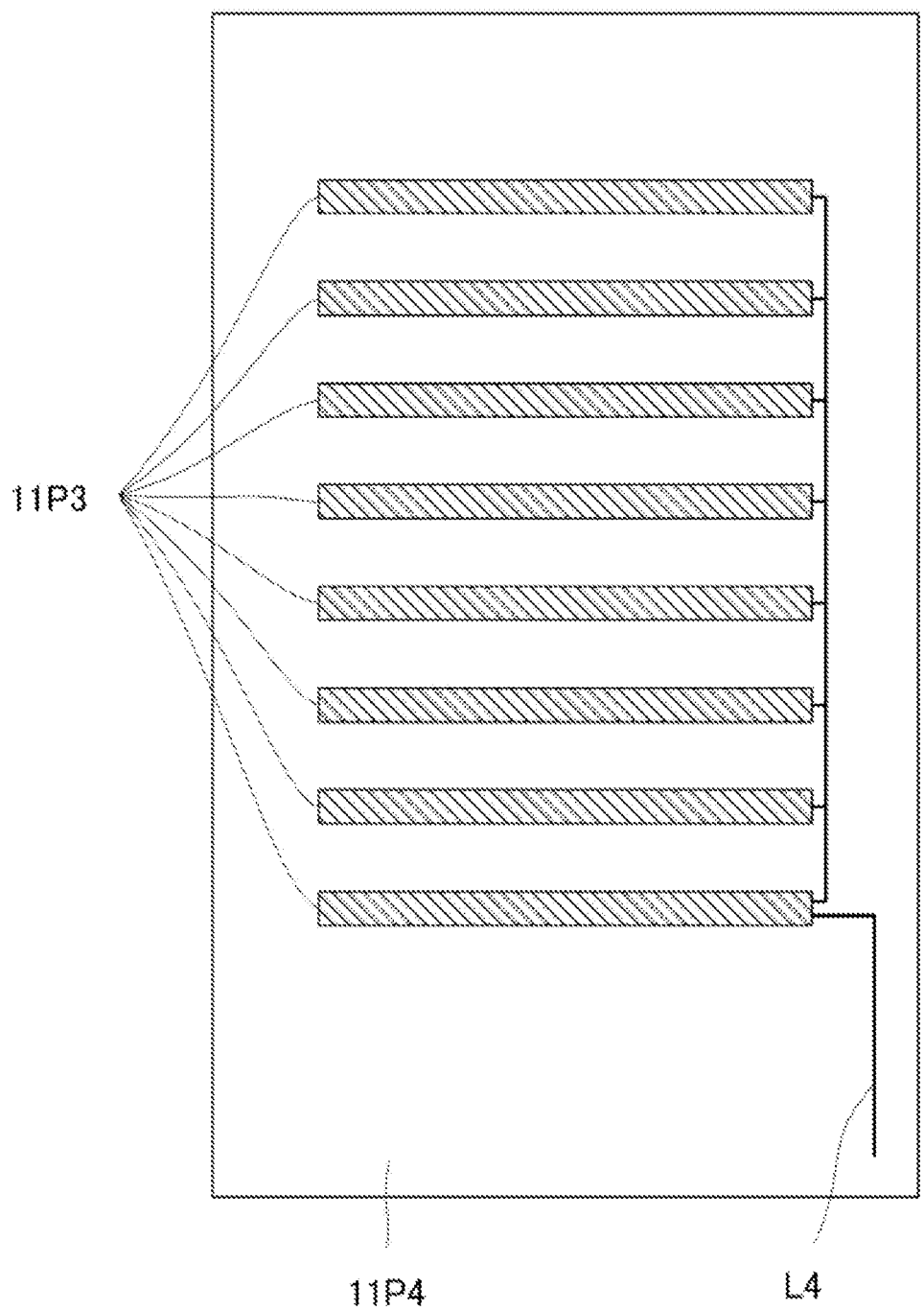
FIG. 7 is a plan view of an insulating substrate 11P4 illustrated in FIG. 2.
Figure 8:
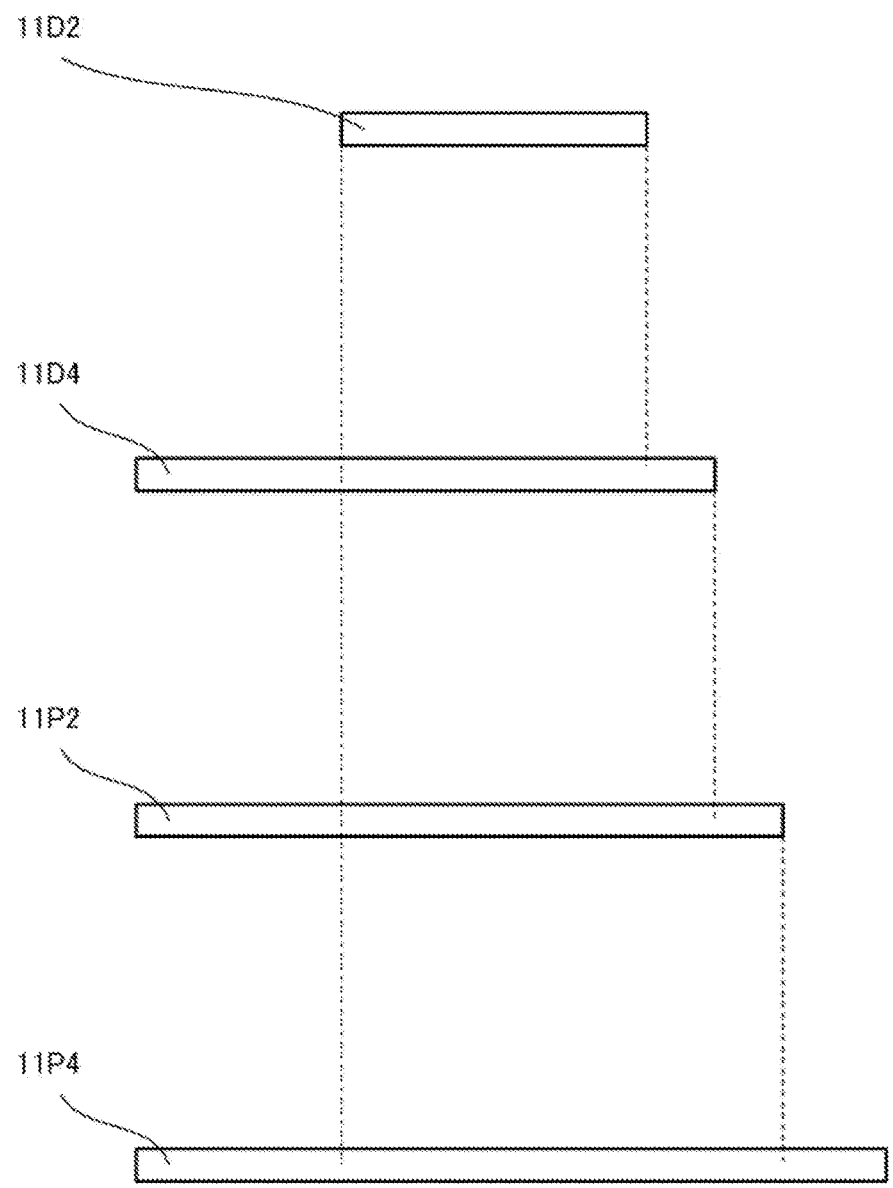
FIG. 8 is a sectional view taken along a line U-U illustrated in FIG. 3.
Figure 9:
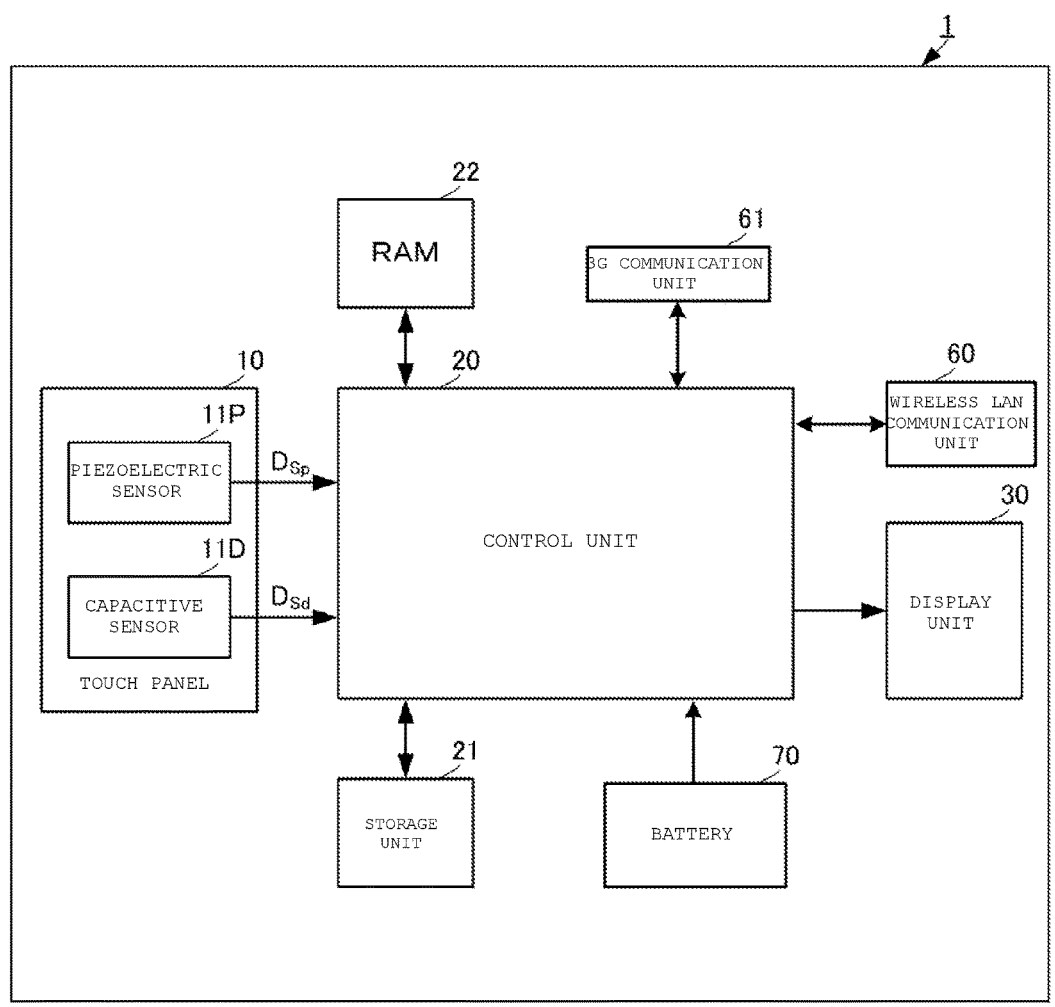
FIG. 9 is a block diagram of the display device 1 illustrated in FIG. 1.

FIG. 1 is an external appearance perspective view of a display device 1 which includes a touch panel 10 according to an embodiment of the present invention. FIG. 2 is a sectional view taken along a line S-S illustrated in FIG. 1. FIG. 3 is an exploded perspective view of the touch panel 10 illustrated in FIG. 2. FIG. 4 is a plan view of an insulating substrate 11D2 illustrated in FIG. 2. FIG. 5 is a plan view of an insulating substrate 11D4 illustrated in FIG. 2. FIG. 6 is a plan view of a piezoelectric film 11P2 illustrated in FIG. 2. FIG. 7 is a plan view of an insulating substrate 11P4 illustrated in FIG. 2. FIG. 8 is a sectional view taken along a line U-U illustrated in FIG. 3. FIG. 9 is a block diagram of the display device 1 illustrated in FIG. 1.

As illustrated in FIG. 1, the display device 1 includes a housing 100 which has a portable size. The display device 1 is, for example, a tablet or a smartphone.

The housing 100 has a cuboid shape whose length and width are thicker than the thickness, and a top surface has an opened shape. As illustrated in FIGS. 1 and 2, an operation plate 110 is fitted to the housing 100 to block an opening surface of the housing 100. One principal surface of the operation plate 110 is an operation surface 101. The operation plate 110 is made of a light-transmissive material.

As illustrated in FIGS. 1 and 2, in the housing 100, the operation plate 110, a capacitive sensor 11D, a piezoelectric sensor 11P, a display unit 30, a control circuit module 52 and a battery 70 illustrated in FIG. 9 are disposed in order from a side of the operation surface 101.

The capacitive sensor 11D and the piezoelectric sensor 11P are combined to form the touch panel 10. The operation plate 110, the capacitive sensor 11D, the piezoelectric sensor 11P and the display unit 30 have flat shapes, and are disposed in the housing 100 such that each flat surface is parallel to the operation surface 101 of the housing 100.

Between a bottom surface of the housing 100 and the display unit 30, a circuit board (not illustrated) is disposed, and the control circuit module 52 is mounted on this circuit board. The control circuit module 52 is a module which realizes a control unit 20, a storage unit 21, a RAM 22, a wireless LAN communication unit 60 and a 3G communication unit 61 illustrated in FIG. 9.

The control circuit module 52 is connected to the capacitive sensor 11D, the piezoelectric sensor 11P, the display unit 30 and the battery 70. In this regard, the control unit 20 includes a connection terminal 80 illustrated in FIG. 3, and is connected to the capacitive sensor 11D and the piezoelectric sensor 11P via the connection terminal 80.

As illustrated in FIGS. 2 to 5, the capacitive sensor 11D includes a plurality of capacitance detection electrodes 11D1, the insulating substrate 11D2 having a flat shape, a plurality of capacitance detection electrodes 11D3 and the insulating substrate 11D4 having a flat shape.

On a surface of the capacitive sensor 11D at a side opposite the piezoelectric sensor 11P, the operation plate 110 is provided. The operation plate 110 is made of a material having an insulation property. The operation plate 110 is made of a light-transmissive material. For example, PET or PP is suitably used for the operation plate 110.

The insulating substrate 11D2 is made of a light-transmissive material (e.g. PET).

As illustrated in FIGS. 2 to 4, the insulating substrate 11D2 includes a top surface located near the operation surface 101 on which a plurality of capacitance detection electrodes 11D1 and wires L1 are formed, and a lower surface which opposes the top surface.

A plurality of capacitance detection electrodes 11D1 has an elongated shape whose elongation direction lies along a first direction. A plurality of capacitance detection electrodes 11D1 is disposed at intervals along a second direction orthogonal to the first direction. A plurality of capacitance detection electrodes 11D1 is made of a light-transmissive material.

The insulating substrate 11D4 is made of a light-transmissive material (e.g. PET).

The insulating substrate 11D4 includes a top surface located near the operation surface 101 on which a plurality of capacitance detection electrodes 11D3 and wires L2 are formed, and a lower surface which opposes the top surface. The lower surface of the insulating substrate 11D2 is attached to the top surface of the insulating substrate 11D4 by a pressure sensitive adhesive.

A plurality of capacitance detection electrodes 11D3 has an elongated shape whose elongation direction lies along the second direction. A plurality of capacitance detection electrodes 11D3 is arranged at intervals along the first direction. A plurality of capacitance detection electrodes 11D3 is made of a light-transmissive material.

As illustrated in FIGS. 2, 3, 6 and 7, the piezoelectric sensor 11P includes a press detection electrode 11P1, the piezoelectric film 11P2 of a flat film shape, a plurality of press detection electrodes 11P3 and the insulating substrate 11P4 having a flat shape.

The piezoelectric film 11P2 includes a top surface located near the operation surface 101 on which a plurality of press detection electrodes 11P1 and wires L3 are formed, and a lower surface which opposes the top surface. A lower surface of the insulating substrate 11D4 is attached to the top surface of the piezoelectric film 11P2 by a pressure sensitive adhesive.

In addition, the top surface of the piezoelectric film 11P2 corresponds to a "first principal surface" according to an embodiment of the present invention. Further, the lower surface of the piezoelectric film 11P2 corresponds to a "second principal surface" according to an embodiment of the present invention. Furthermore, the press detection electrode 11P1 and the wires L3 correspond to a "first conductor pattern" according to an embodiment of the present invention.

The insulating substrate 11P4 is made of a light-transmissive material (e.g. PET).

The insulating substrate 11P4 includes a top surface located near the operation surface 101 on which a plurality of press detection electrodes 11P3 and wires L4 are formed, and a lower surface which opposes the top surface. A lower surface of the piezoelectric film 11P2 is attached to the top surface of the insulating substrate 11P4 by a pressure sensitive adhesive.

In addition, the top surface of the insulating substrate 11P4 corresponds to a "third principal surface" according to an embodiment of the present invention.

Further, the lower surface of the insulating substrate 11P4 corresponds to a "fourth principal surface" according to an embodiment of the present invention. Furthermore, a plurality of press detection electrode 11P3 and the wires L4 correspond to a "second conductor pattern" according to an embodiment of the present invention.

In this regard, as illustrated in FIGS. 3 to 7, the insulating substrate 11D2 includes cutout portions 87 through which part of the wires L2 of the insulating substrate 11D4, part of the wires L3 of the piezoelectric film 11P2 and part of the wires L4 of the insulating substrate 11P4 are exposed.

Further, the insulating substrate 11D4 includes a cutout portion 88 through which part of the wires L3 of the piezoelectric film 11P2 and part of the wires L4 of the insulating substrate 11P4 are exposed. Furthermore, the piezoelectric film 11P2 includes a cutout portion 89 through which part of the wires L4 of the insulating substrate 11P4 are exposed.

As illustrated in FIGS. 3 and 8, the cutout portions 87 to 89 are formed in stepwise shapes.

In addition, as illustrated in FIG. 6, a normal direction H of an inner corner 92 of a rim 91 located near the cutout portion 89 of the piezoelectric film 11P2 does not match with a uniaxial stretching direction 900 of the piezoelectric film 11P2. The inner corner 92 has a radiused shape. In this regard, the most preferably, an angle difference between the normal direction H and the uniaxial stretching direction 900 is orthogonal. However, by making the angle difference at least 45° or more, it is possible to provide the effect according to the present embodiment.

Further, a tangential direction S of the inner corner 92 of the rim 91 located near the cutout portion 89 of the piezoelectric film 11P2 does not match with a high shrinkage direction 800 of the piezoelectric film 11P2. An angle formed between the uniaxial stretching direction 900 and the high shrinkage direction 800 on the piezoelectric film 11P2 is 90°. The high shrinkage direction 800 of the piezoelectric film 11P2 is a direction in which the piezoelectric film 11P2 is shrunk the most significantly by heating. In this regard, the most preferably, an angle difference between the tangential direction S and the high shrinkage direction 800 is orthogonal. However, by making the angle difference at least 45° or more, it is possible to provide the effect according to the present embodiment.

For example, a heat cycle of leaving the piezoelectric film 11P2 under low-temperature environment of −40 degrees for 30 minutes, and then leaving the piezoelectric film 11P2 under high-temperature environment of +85 degrees for 30 minutes is repeated 100 times. In this case, the length of the piezoelectric film 11P2 in the uniaxial stretching direction 900 changes little; however, the length of the piezoelectric film 11P2 in the high shrinkage direction 800 is shrunk by approximately 1% in an irreversible way.

As illustrated in FIGS. 3 to 7, a plurality of capacitance detection electrodes 11D1 is connected to the connection terminal 80 via the wires L1. A plurality of capacitance detection electrodes 11D3 is connected to the connection terminal 80 via the wires L2. The connection terminal 80 is a flexible printed circuit board on which wires are formed.

Similarly, the press detection electrode 11P1 is connected to the connection terminal 80 via the wires L3. A plurality of press detection electrodes 11P3 is connected to the connection terminal 80 via the wires L4.

In the touch panel 10 adopting the above structure, as illustrated in FIGS. 3 to 7, all wires L1 to L4 of the substrate 11D2, the substrate 11D4, the piezoelectric film 11P2 and the substrate 11P4 are directed to an identical direction, so that there is an advantage that it is possible to establish connection with the connection terminal 80 as single-side contact.

The capacitive sensor 11D detects a change in a capacitance produced by an approach or a contact of a user's finger, by using the capacitance detection electrodes 11D1 and 11D3, and outputs a signal based on this detection as an operation detection signal to the control circuit module 52 via the wires L1 and L2.

The piezoelectric sensor 11P detects the charges produced when the user presses a flat film surface of the piezoelectric film 11P2 and then the piezoelectric film 11P2 is flexed, by using via the press detection electrodes 11P1 and 11P3, and outputs a signal based on this detection as a press detection signal to the control circuit module 52 via the wires L3 and L4.

In addition, the piezoelectric film 11P2 needs to be a film having piezoelectricity, and is preferably made of uniaxially stretched polylactic acid (PLA) and is more preferably made of poly-L-lactic acid (PLLA).

Such PLLA is made of a chiral polymer and has a main chain which adopts a spiral structure. The PLLA has piezoelectricity when the PLLA is uniaxially stretched and molecules are oriented. Further, a flat film surface of the piezoelectric film is pressed, so that the uniaxially stretched PLLA produces charges. In this case, the amount of produced charges is uniquely determined based on a displacement amount obtained when the flat film surface is displaced in a direction orthogonal to the flat film surface by the press. A piezoelectric constant of the uniaxially stretched PLLA belongs to a group of very high piezoelectric constants among polymers.

Consequently, it is possible to reliably detect displacement caused by a press with a high sensitivity by using PLLA. That is, it is possible to reliably detect a press, and detect a press amount with a high sensitivity.

A stretching ratio is preferably 3 to 8. By performing heating treatment after performing stretching, crystallization of extended chain crystal of polylactic acid is accelerated, and the piezoelectric constant improves. In addition, when biaxial stretching is performed, it is possible to provide the same effect as that of uniaxial stretching by employing different stretching ratios for respective axes.

When, for example, a given direction is an X axis and the film is stretched to eight times the film in an X axis direction, and the film is stretched to twice the film in a Y axis direction orthogonal to the X axis, it is possible to provide the substantially same effect in terms of the piezoelectric constant as an effect obtained when the film is subjected to uniaxial stretching to be stretched to four times the film in the X axis direction. A simply uniaxially stretched film is likely to break in a stretching axial direction. Consequently, by performing biaxial stretching as described above, it is possible to increase the strength to some degree.

Further, the PLLA exhibits piezoelectricity as a result of molecular orientation treatment by stretching, and does not need to be subjected to poling treatment unlike other polymers such as PVDF or piezoelectric ceramic. That is, the piezoelectricity of the PLLA which does not belong to ferroelectrics is exhibited not by ion polarization as in ferroelectrics such as PVDF or PZT, but derives from a spiral structure which is a characteristic structure of molecules.

Hence, the PLLA does not exhibit pyroelectricity produced by other ferroelectric piezoelectric bodies. Further, although PVDF fluctuates in a piezoelectric constant with time and the piezoelectric constant significantly lowers in some cases, a piezoelectric constant of the PLLA is very stable over time. Consequently, it is possible to detect displacement caused by a press with a high sensitivity without an influence from surrounding environment.

As illustrated in FIGS. 2, 3 and 6, this uniaxially stretched piezoelectric film 11P2 is preferably disposed in the housing 100 such that the uniaxial stretching direction 900 forms an angle of nearly 45° with respect to two orthogonal directions along a side surface of the housing 100. By disposing the piezoelectric film 11P2 in this way, it is possible to detect displacement with a higher sensitivity.

Consequently, it is possible to detect a press and a press amount with a higher sensitivity.

For the press detection electrodes 11P1 and 11P3, one of organic electrodes whose main components are polythiophene and polyaniline, and inorganic electrodes such as ITO, ZnO, silver nanowire electrodes, carbon nanotubes and graphene is preferably used as illustrated in FIGS. 2, 3, 6 and 7. By using such a material, it is possible to form a highly light-transmissive conductor pattern.

As illustrated in FIGS. 1 and 2, the display unit 30 is disposed on the other principal surface of the touch panel 10 inside the housing 100. The display unit 30 is a so-called flat display, and, more specifically, is formed by liquid crystal display elements.

The display unit 30 includes a liquid crystal panel 301, a top surface polarizing plate 302, a back surface polarizing plate 303 and a backlight 304. The top surface polarizing plate 302 and the back surface polarizing plate 303 are disposed to sandwich the liquid crystal panel 301. The backlight 304 is disposed at an opposite side to the liquid crystal panel 301 across the back surface polarizing plate 303.

Next, as illustrated in FIG. 9, the display device 1 includes the touch panel 10, the control unit 20, the storage unit 21, the RAM 22, the display unit 30, the wireless LAN communication unit 60, the 3G communication unit 61 and the battery 70.

The storage unit 21 is configured by, for example, a flash memory. The storage unit 21 stores a control program in which a method for controlling each unit of the display device 1 is described.

The control unit 20 is configured by, for example, a CPU. Further, the control unit 20 includes a timer circuit which times a current time and a current date. The control unit 20 controls an operation of each unit of the display device 1 according to the control program stored in the storage unit 21. The control unit 20 expands data to be processed by the control program, to the RAM 22.

The touch panel 10 includes the piezoelectric sensor 11P and the capacitive sensor 11D.

The piezoelectric sensor 11P generates a press detection signal of a signal $D_{Sp}$ corresponding to a press amount (pressing force) when the operation surface 101 is pressed. The piezoelectric sensor 11P outputs the press detection signal to the control unit 20.

The capacitive sensor 11D is a capacitance sensor, and generates an operation detection signal indicating a value of a detected capacitance of each electrode of the touch panel 10. A signal level $D_{Sd}$ of the operation detection signal depends on a change amount of a capacitance produced when the user's finger approaches or touches the capacitive sensor 11D. The capacitive sensor 11D outputs the generated operation detection signal to the control unit 20.

When detecting that the signal level $D_{Sd}$ of the operation detection signal outputted from the capacitive sensor 11D is larger than a predetermined threshold, the control unit 20 obtains an operation position from this operation detection signal.

The control unit 20 determines operation input contents based on the press detection signal and the operation detection signal. In this case, the control unit 20 uses the storage unit 21 as a storage area for processing of determining operation input contents. The control unit 20 generates image data based on the determined operation input contents to output the image data to the display unit 30.

The display unit 30 displays images on the operation surface 101 based on the image data.

The wireless LAN communication unit 60 and the 3G communication unit 61 include antennas which are not illustrated. The wireless LAN communication unit 60 communicates with a server device (not illustrated) via a wireless LAN router connected to the Internet. The 3G communication unit 61 communicates with the server device (not illustrated) via a base station connected to a mobile telephone network.

The battery 70 supplies DC working power to each unit of the display device 1.

Next, a piezoelectric sensor 111P according to a reference example of the embodiment of the present invention will be described.

Figure 10:
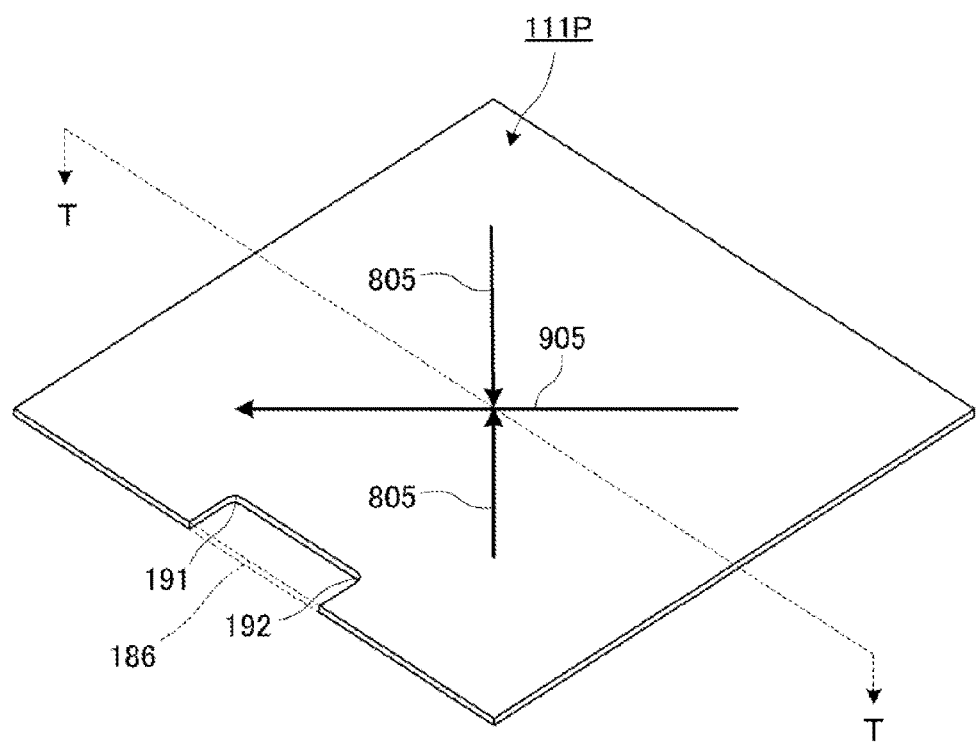
FIG. 10 is an external appearance perspective view of a piezoelectric sensor 111P according to a reference example of the embodiment of the present invention.
Figure 11:
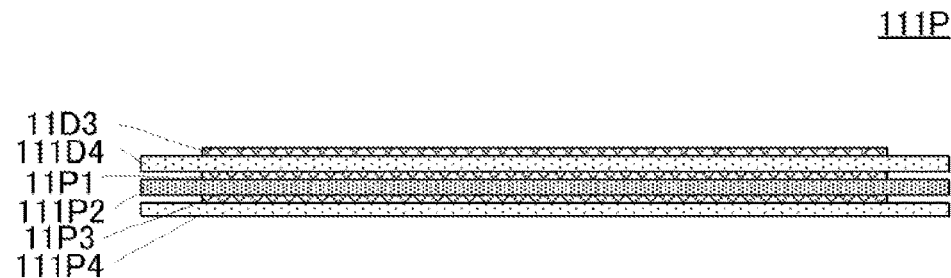
FIG. 11 is a sectional view taken along a line T-T illustrated in FIG. 10.

FIG. 10 is an external appearance perspective view of a piezoelectric sensor 111P according to the reference example of the embodiment of the present invention. FIG. 11 is a sectional view taken along a line T-T illustrated in FIG. 10. This piezoelectric sensor 111P and the piezoelectric sensor 11P illustrated in FIGS. 2 to 7 differ in shapes and the numbers of stacked layers. Other points are the same, and therefore will not be described. In addition, FIG. 10 does not illustrate a plurality of capacitance detection electrodes 11D3 for ease of description.

As illustrated in FIG. 10, at a center portion of one side of the piezoelectric sensor 111P, one cutout portion 186 is formed. Hence, the piezoelectric sensor 111P includes inner corners 191 and 192 of two radiused shapes.

As illustrated in FIG. 11, the piezoelectric sensor 111P includes a plurality of capacitance detection electrodes 11D3, an insulating substrate 111D4, a press detection electrode 11P1, a piezoelectric film 111P2 of a flat film shape, a plurality of press detection electrodes 11P3 and an insulating substrate 111P4 having a flat shape. Unlike the piezoelectric sensor 11P illustrated in FIGS. 2 to 7, the piezoelectric sensor 111P does not include a plurality of capacitance detection electrodes 11D1 and the insulating substrate 11D2.

In addition, the insulating substrate 111D4 and the insulating substrate 11D4 differ in shapes, and other points are the same. Further, the piezoelectric film 111P2 and the piezoelectric film 11P2 differ in shapes, and other points are the same. Furthermore, the insulating substrate 111P4 and the insulating substrate 11P4 differ in shapes, and other points are the same.

In this regard, the piezoelectric film 111P2 is uniaxially stretched in a uniaxial stretching direction 905 as illustrated in FIG. 10. Further, the normal direction of the inner corner 192 matches with the uniaxial stretching direction 905 of the piezoelectric film 111P2. The normal direction of the inner corner 191 does not match with the uniaxial stretching direction 905 of the piezoelectric film 111P2. In addition, the most preferably, an angle difference between the normal direction of the inner corner 191 and the uniaxial stretching direction 905 is orthogonal. However, by making the angle difference at least 45° or more, it is possible to provide the effect according to the present embodiment.

Further, the tangential direction of the inner corner 192 matches with a high shrinkage direction 805 of the piezoelectric film 111P2. The tangential direction of the inner corner 191 does not match with the high shrinkage direction 805 of the piezoelectric film 111P2. In this regard, the most preferably, an angle difference between the tangential direction S of the inner corner 191 and the high shrinkage direction 805 is orthogonal. However, by making the angle difference at least 45° or more, it is possible to provide the effect according to the present embodiment.

A result obtained by conducting a heat cycle test on the piezoelectric sensor 111P according to the reference example of the embodiment of the present invention will be examined below.

Figure 12:
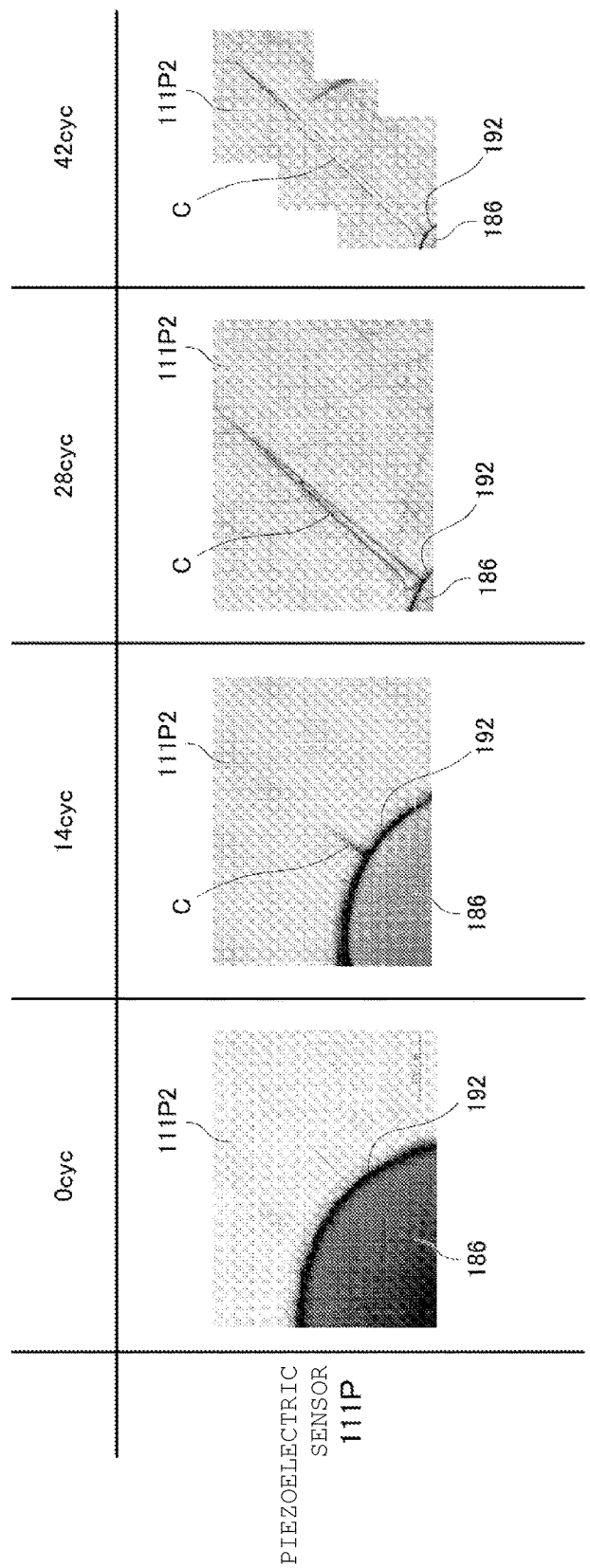
FIG. 12 is an enlarged plan view illustrating a relationship between the number of times of heat cycles and a state of a crack at an inner corner 192 of the piezoelectric sensor 111P illustrated in FIG. 10.

FIG. 12 is an enlarged plan view illustrating a relationship between the number of times of heat cycles (cyc) and a state of a crack at the inner corner 192 of the piezoelectric sensor 111P illustrated in FIG. 10. FIG. 12 illustrates an experiment result obtained by capturing an image of the inner corner 192 of the piezoelectric sensor 111P under conditions that a heat cycle of leaving the piezoelectric sensor 111P in low-temperature environment of −40 degrees for 30 minutes and leaving the piezoelectric sensor 111P in high-temperature environment of +85 degrees for 30 minutes was repeated a plurality of times.

The experiment shows that a crack C grows at the inner corner 192 of the piezoelectric sensor 111P as the heat cycle is repeated.

Meanwhile, it was found that the inner corner 191 of the piezoelectric sensor 111P differs from the inner corner 192 of the piezoelectric sensor 111P in that a crack is not produced even when the heat cycle is repeated.

The reason for the above result is that uniaxially stretched PLLA forms an extended chain in the uniaxial stretching direction 905, and therefore has a property that the PLLA is readily broken along the uniaxial stretching direction 905.

Further, another reason for the above result is as follows. The piezoelectric film 111P2 needs to be disposed such that the uniaxial stretching direction 905 is directed to 45° to detect a bend or detect a press. However, a heat shrinkage ratio of the piezoelectric film 111P2 differs in the uniaxial stretching direction 905 and the high shrinkage direction 805 as described above. Shrinkage of the piezoelectric film 111P2 in the high shrinkage direction 805 is suppressed by a pressure sensitive adhesive, and therefore a significant stress is applied from the inner corner 192 of the piezoelectric film 111P2 along the uniaxial stretching direction 905.

In view of the above examination, the piezoelectric sensor 11P according to the embodiment of the present invention, and a piezoelectric sensor 211P according to a first comparative example of the present invention and a piezoelectric sensor 311P according to a second comparative example of the embodiment of the present invention will be compared.

Figure 13:
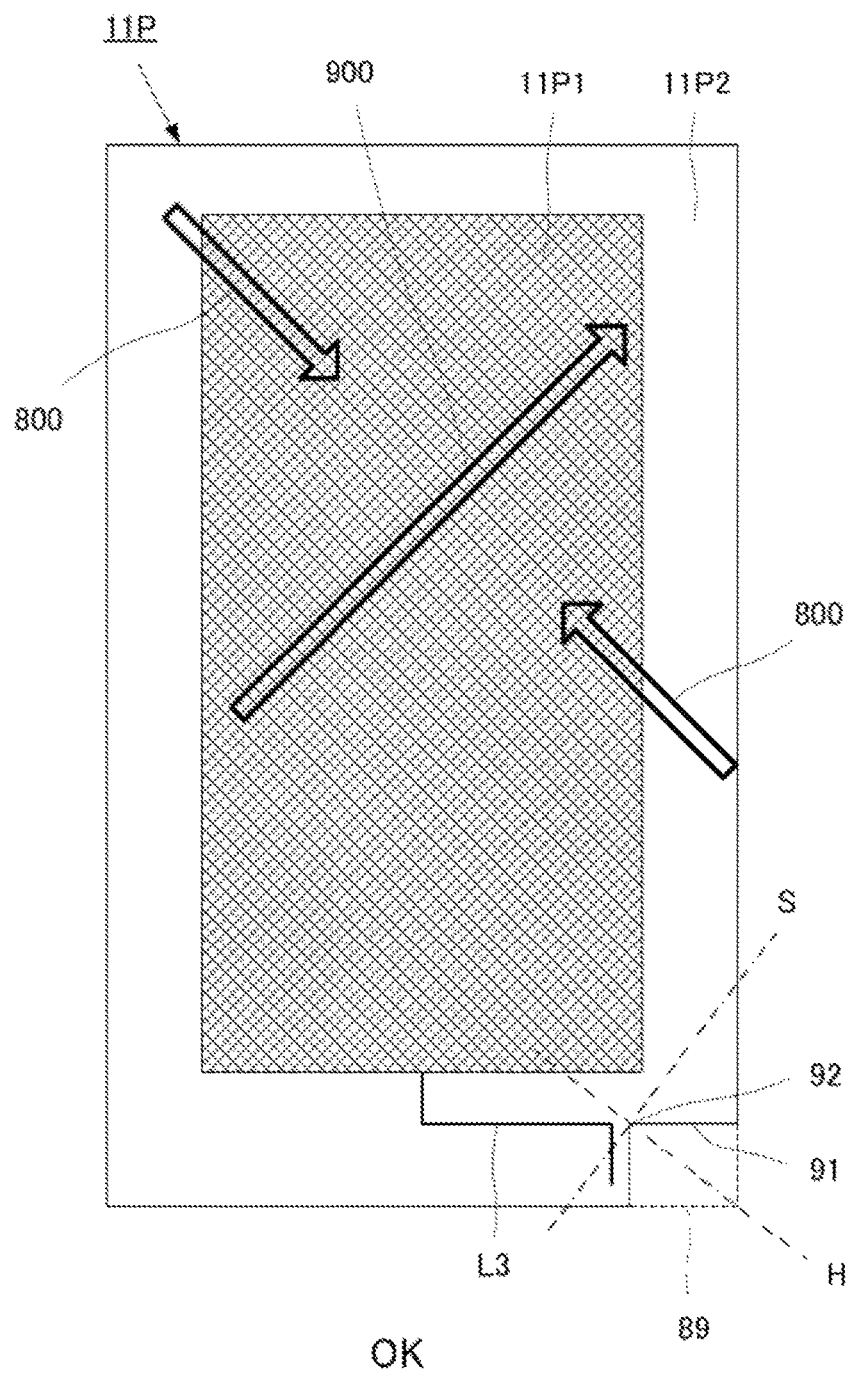
FIG. 13 is a plan view of a piezoelectric film 11P2 of a piezoelectric sensor 11P according to the embodiment of the present invention.
Figure 14:
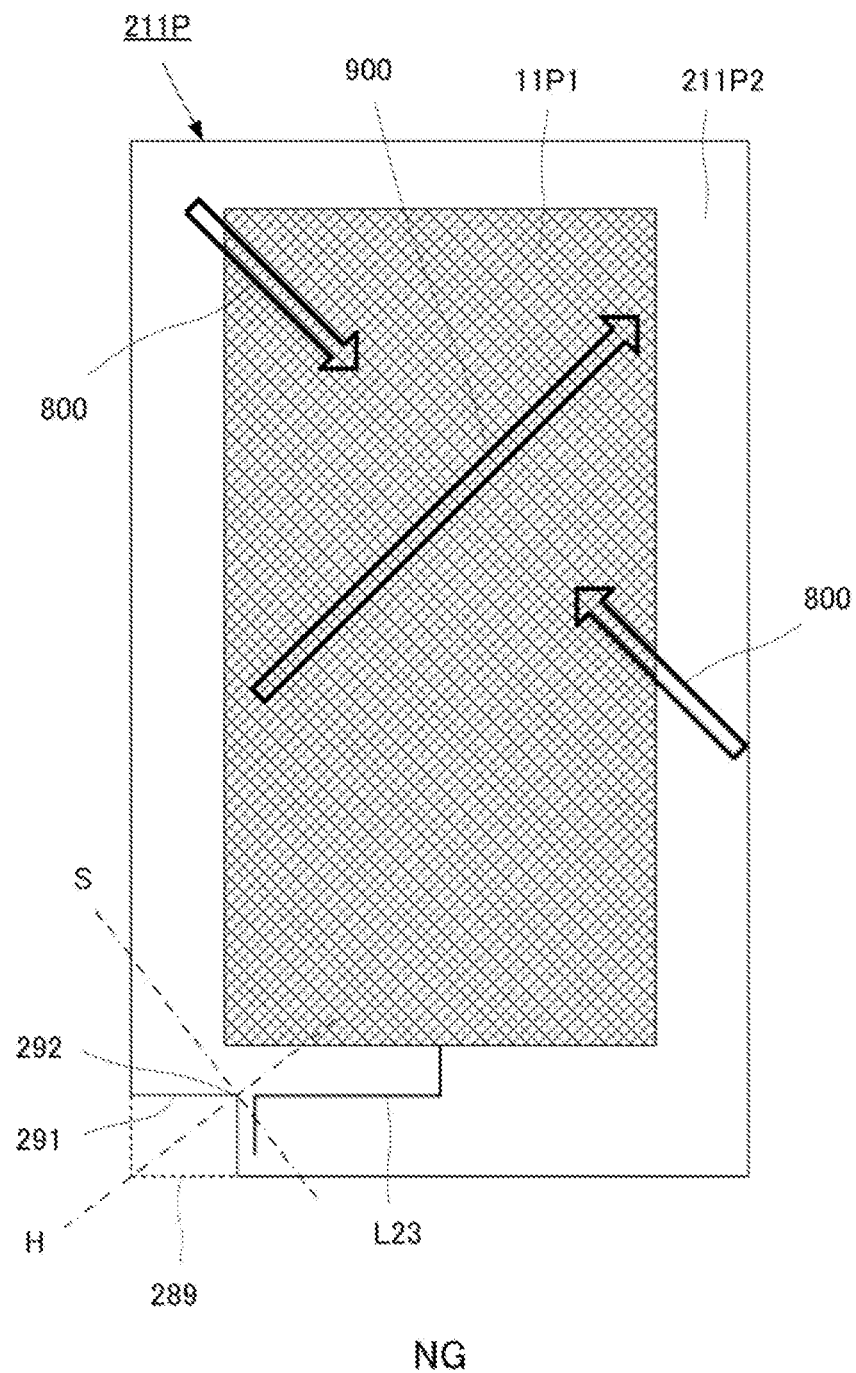
FIG. 14 is a plan view of a piezoelectric film 211P2 of a piezoelectric sensor 211P according to a first comparative example of the embodiment of the present invention.
Figure 15:
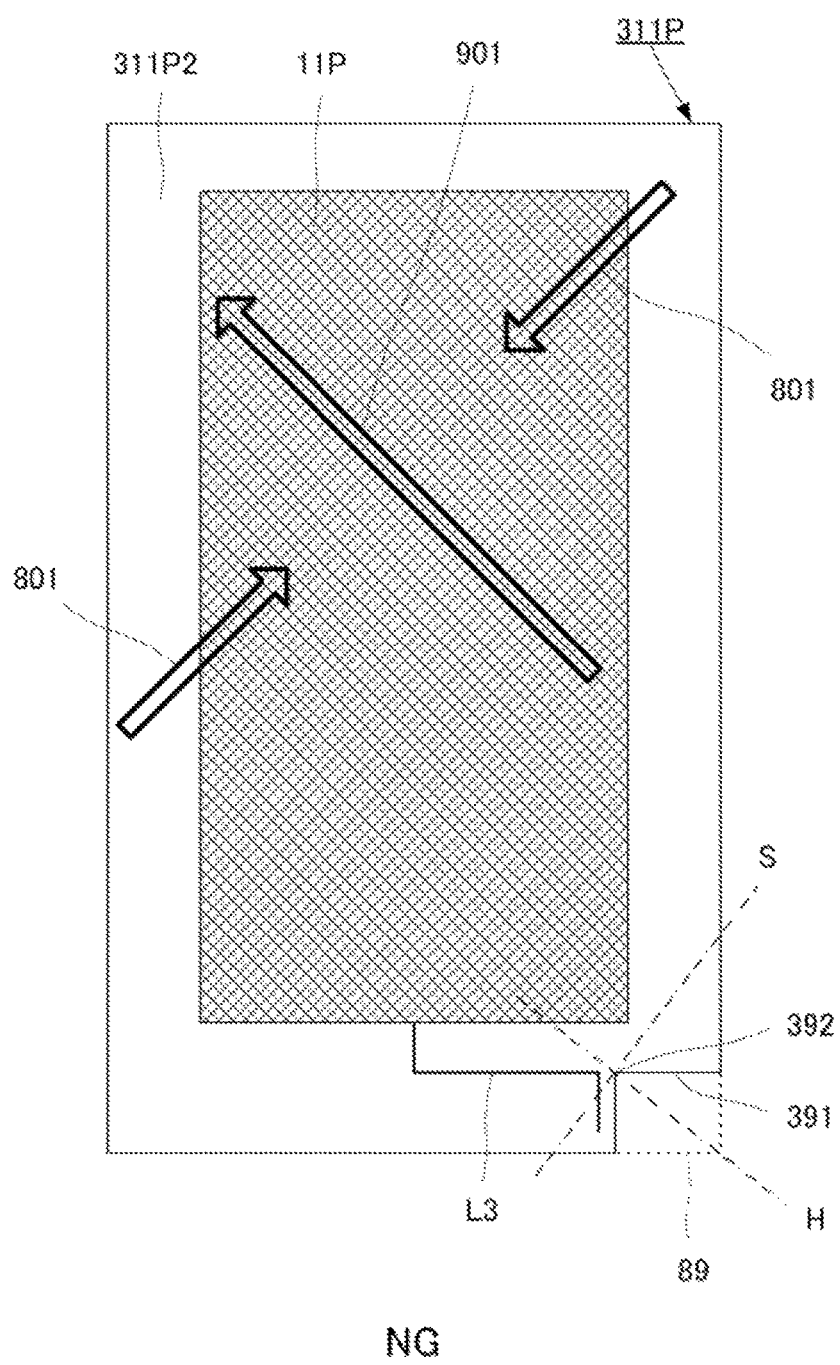
FIG. 15 is a plan view of a piezoelectric film 311P2 of a piezoelectric sensor 311P according to a second comparative example of the embodiment of the present invention.

FIG. 13 is a plan view of the piezoelectric sensor 11P according to the embodiment of the present invention. FIG. 14 is a plan view of the piezoelectric sensor 211P according to the first comparative example of the embodiment of the present invention. FIG. 15 is a plan view of the piezoelectric sensor 311P according to the second comparative example of the embodiment of the present invention.

In this regard, the piezoelectric sensor 211P differs from the piezoelectric sensor 11P in a formation portion at which a cutout portion 289 is formed, and the other points are the same. Further, the piezoelectric sensor 311P differs from the piezoelectric sensor 11P in a uniaxial stretching direction 901 and a high shrinkage direction 801, and the other points are the same.

In addition, below the piezoelectric sensor 11P, the piezoelectric sensor 211P and the piezoelectric sensor 311P illustrated in FIGS. 13 to 15, characters indicating whether or not a crack is produced (OK or NG) are indicated.

As illustrated in FIG. 13, the normal direction H of the inner corner 92 of the rim 91 located near the cutout portion 89 of the piezoelectric film 11P2 does not match with the uniaxial stretching direction 900 of the piezoelectric film 11P2. Further, the tangential direction S of the inner corner 92 of the rim 91 located near the cutout portion 89 of the piezoelectric film 11P2 does not match with a high shrinkage direction 800 of the piezoelectric film 11P2.

In addition, the most preferably, an angle difference between the normal direction H of the inner corner 92 and the uniaxial stretching direction 900 is orthogonal. However, by making the angle difference at least 45° or more, it is possible to provide the effect according to the present embodiment. Further, the most preferably, an angle difference between the tangential direction S of the inner corner 92 and the high shrinkage direction 800 is orthogonal. However, by making the angle difference at least 45° or more, it is possible to provide the effect according to the present embodiment.

That is, a direction in which the piezoelectric film 11P2 is readily broken or a direction in which a crack is readily produced is different from the normal direction H of the inner corner 92 of the rim 91 located near the cutout portion 89 of the piezoelectric film 11P2. Hence, at the inner corner 92 of the rim 91 located near the cutout portion 89 of the piezoelectric film 11P2, a crack is not produced.

Meanwhile, as illustrated in FIG. 14, the normal direction H of the inner corner 292 of a rim 291 located near the cutout portion 289 of the piezoelectric film 211P2 matches with the uniaxial stretching direction 900 of the piezoelectric film 211P2. Further, the tangential direction S of the inner corner 292 of the rim 291 located near the cutout portion 289 of the piezoelectric film 211P2 matches with the high shrinkage direction 800 of the piezoelectric film 211P2.

That is, a direction in which the piezoelectric film 211P2 is readily broken or a direction in which a crack is readily produced is the same as the normal direction H of the inner corner 292 of the rim 291 located near the cutout portion 289 of the piezoelectric film 211P2. Hence, a crack is produced from the inner corner 292 of the rim 291 located near the cutout portion 289 of the piezoelectric film 211P2 along the uniaxial stretching direction 900 of the piezoelectric film 211P2.

Similarly, as illustrated in FIG. 15, the normal direction H of an inner corner 392 of a rim 391 located near the cutout portion 89 of a piezoelectric film 311P2 matches with the uniaxial stretching direction 901 of the piezoelectric film 311P2. Further, the tangential direction S of the inner corner 392 of the rim 391 located near the cutout portion 89 of the piezoelectric film 311P2 matches with the high shrinkage direction 801 of the piezoelectric film 311P2.

That is, a direction in which the piezoelectric film 311P2 is readily broken or a direction in which a crack is readily produced is the same as the normal direction H of the inner corner 392 of the rim 391 located near the cutout portion 89 of the piezoelectric film 311P2. Hence, a crack is produced from the inner corner 392 of the rim 391 located near the cutout portion 89 of the piezoelectric film 311P2 along the uniaxial stretching direction 901 of the piezoelectric film 311P2.

Consequently, the piezoelectric sensor 11P according to the present embodiment can prevent a crack from being produced in the piezoelectric film 11P2.

Further, the inner corner 92 of the piezoelectric sensor 11P according to the present embodiment has a radiused shape, so that a stress to be applied to the inner corner 92 is alleviated compared to a case where the inner corner 92 has a right-angle shape.

Furthermore, as illustrated in FIGS. 3 and 8, the cutout portions 87 to 89 are formed in stepwise shapes. Hence, the insulating substrate 11P4 is a base of the piezoelectric film 11P2, and the piezoelectric film 11P2 is a base of the insulating substrate 11D4. A load to be applied to the piezoelectric film 11P2 caused by connection with the connection terminal 80 is reduced by forming such base structures. Consequently, it is possible to reduce a crack to be produced in the piezoelectric film 11P2.

In addition, in the embodiment, a planar shape of the piezoelectric film 11P2 is a rectangular shape, but is not limited to this. Planar shapes of the piezoelectric film may be other planar shapes such as a square shape, a circular shape, a trapezoidal shape, a parallelogram shape, polygonal shapes such as quadrangular or more shapes, an elliptical shape and an oval shape.

Figure 16:
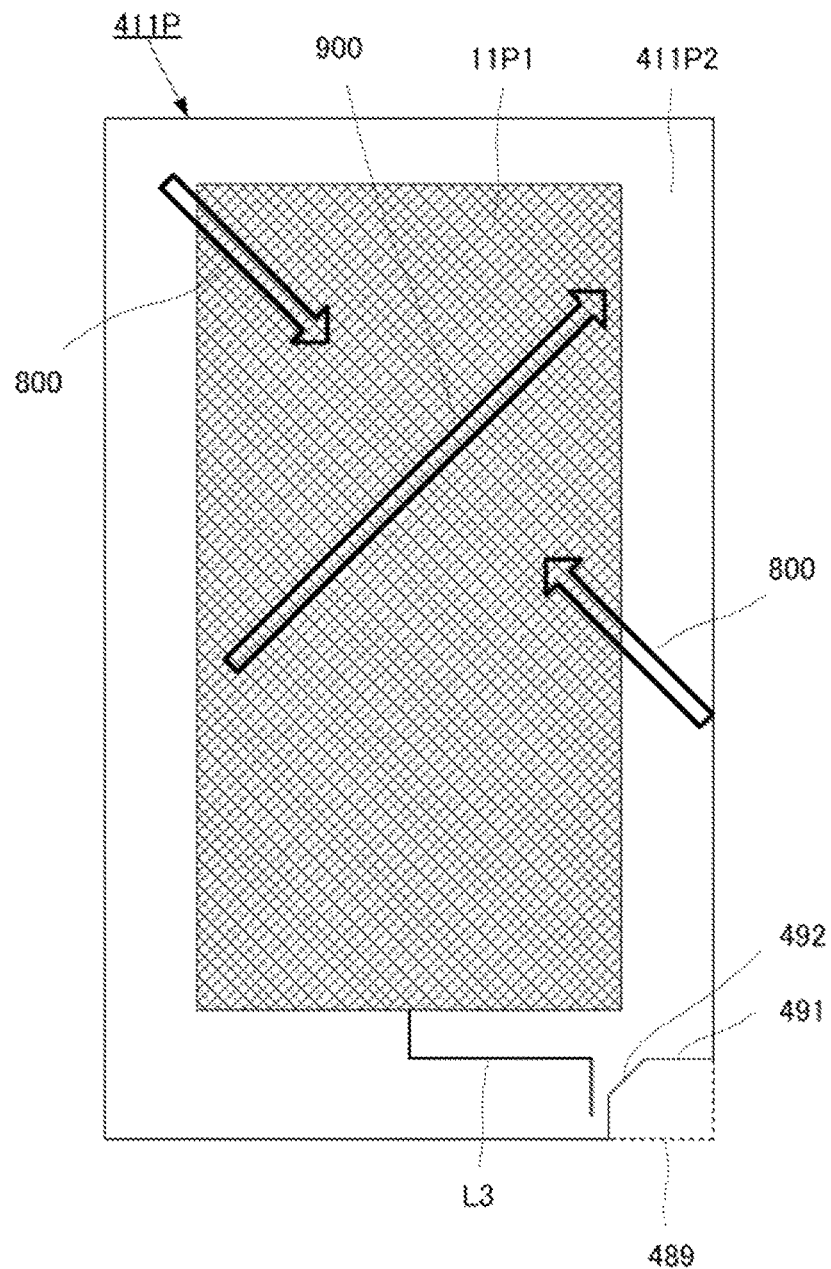
FIG. 16 is a plan view of a piezoelectric film 411P2 of a piezoelectric sensor 411P according to a first modified example of the embodiment of the present invention.

Further, in the embodiment, the piezoelectric film 11P2 has the inner corner 92 with a radiused shape. However, the embodiment is not limited to this. When the embodiment is carried out, as illustrated in FIG. 16, a piezoelectric film 411P2 may include an inner corner 492 of a polygonal shape, and an interior angle of each vertex of the inner corner 492 may be an obtuse angle. According to this configuration, a stress to be applied to the inner corner 492 is alleviated compared to a case where the inner corner 492 has a right-angle shape.

Further, in the embodiment, the lower surface of the insulating substrate 11D4 is attached to the top surface of the piezoelectric film 11P2 by a pressure sensitive adhesive. However, the embodiment is not limited to this. It is preferable that a pressure sensitive adhesive is not applied around the cutout portion 89 on the top surface of the piezoelectric film 11P2 similar to coated areas 501 to 503 of the pressure sensitive adhesive illustrated in FIGS. 17 to 19.

Consequently, piezoelectric sensors 511P to 711P can reduce a load to be applied to the cutout portion 89. Consequently, the piezoelectric sensors 511P to 711P can reduce a crack to be produced in the piezoelectric film 11P.

Figure 17:
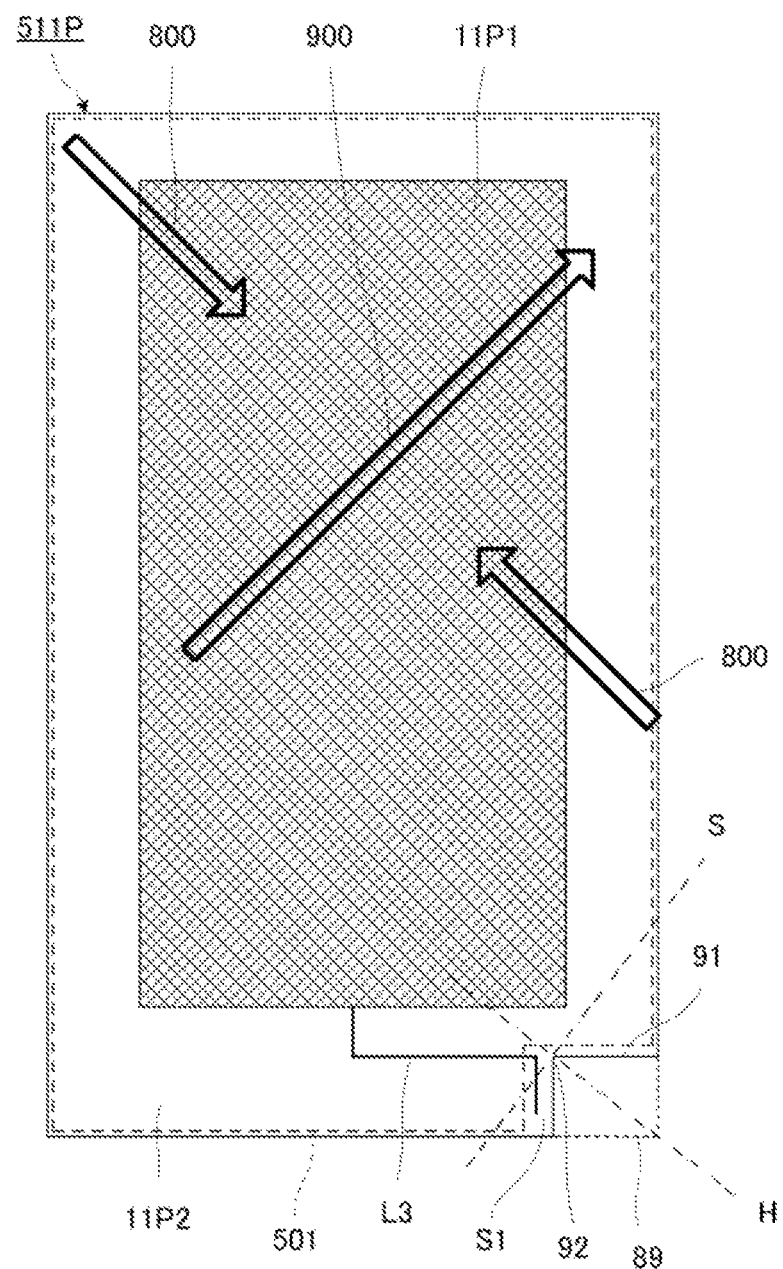
FIG. 17 is a plan view of the piezoelectric film 11P2 of a piezoelectric sensor 511P according to a second modified example of the embodiment of the present invention.
Figure 18:
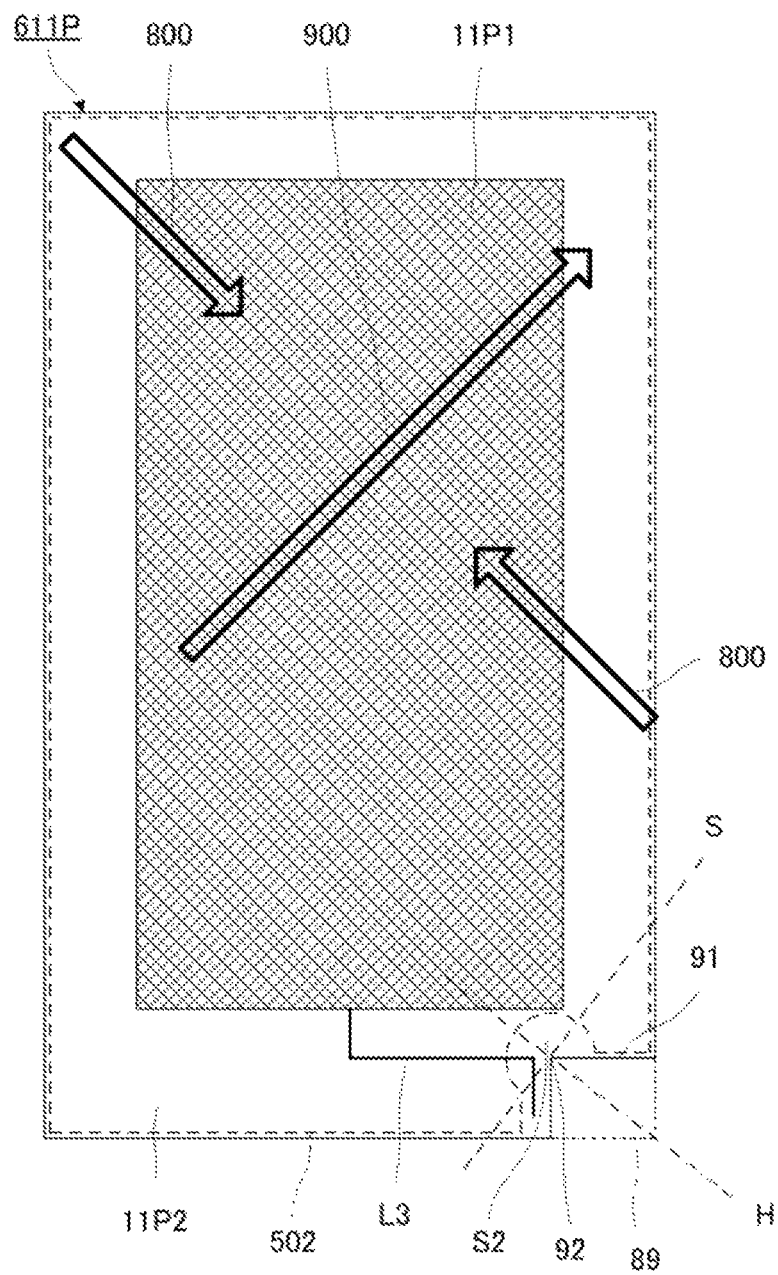
FIG. 18 is a plan view of the piezoelectric film 11P2 of a piezoelectric sensor 611P according to a third modified example of the embodiment of the present invention.
Figure 19:
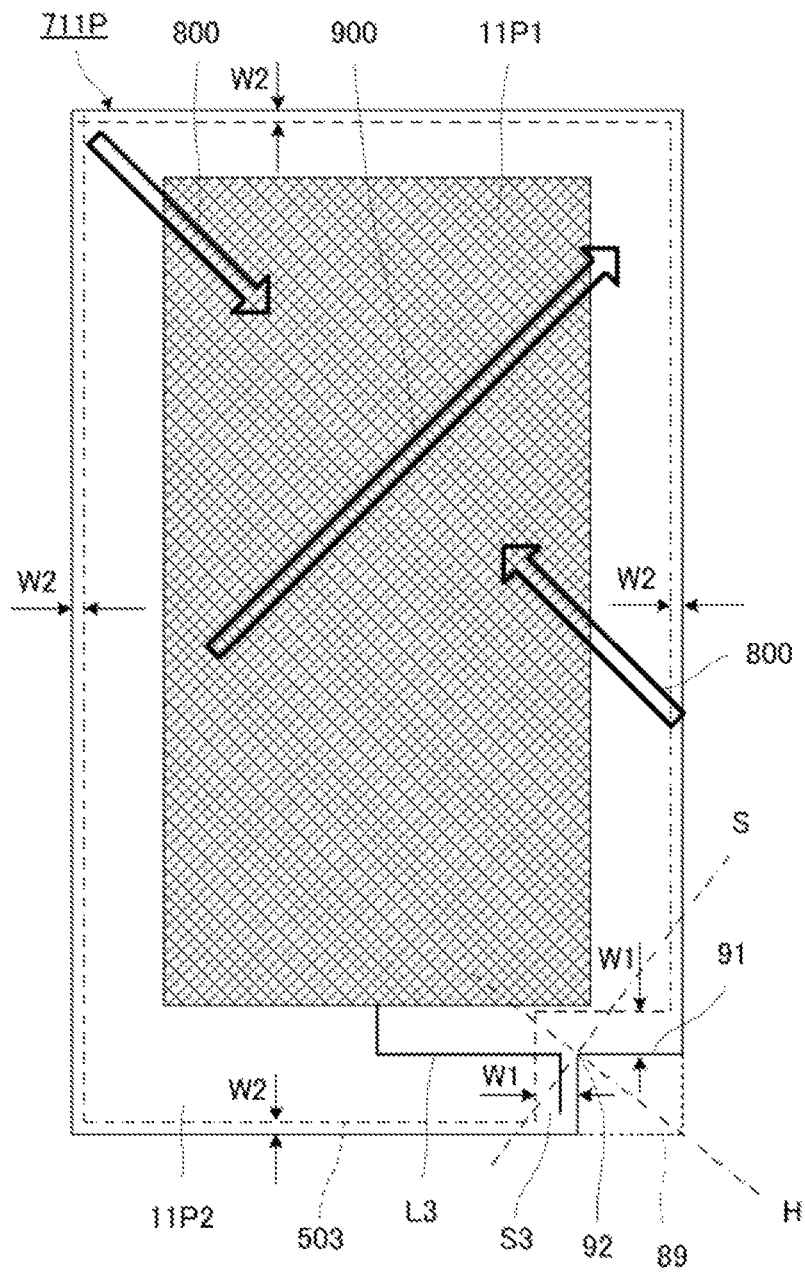
FIG. 19 is a plan view of the piezoelectric film 11P2 of a piezoelectric sensor 711P according to a fourth modified example of the embodiment of the present invention.

In addition, FIGS. 17 to 19 illustrate blank areas S1 to S3 to which a pressure sensitive adhesive is not applied on the top surface of the piezoelectric film 11P2.

Further, as illustrated in FIG. 19, it is preferable to make a width W1 from the rim 91 to the coated area 503 wider than a width W2 from the other sides to the coated area 503.

Consequently, even if an area to which a pressure sensitive adhesive is applied is displaced from the coated area 503 during manufacturing, the piezoelectric sensor 711P can absorb a coating variation of a pressure sensitive adhesive.

In this regard, by determining as a defective part the piezoelectric film 11P2 whose pressure sensitive adhesive protrudes from an outer rim of the piezoelectric film 11P2, it is possible to prevent manufacturing of the piezoelectric sensor 711P whose cutout portion 89 is solidified by the pressure sensitive adhesive.

Figure 20:
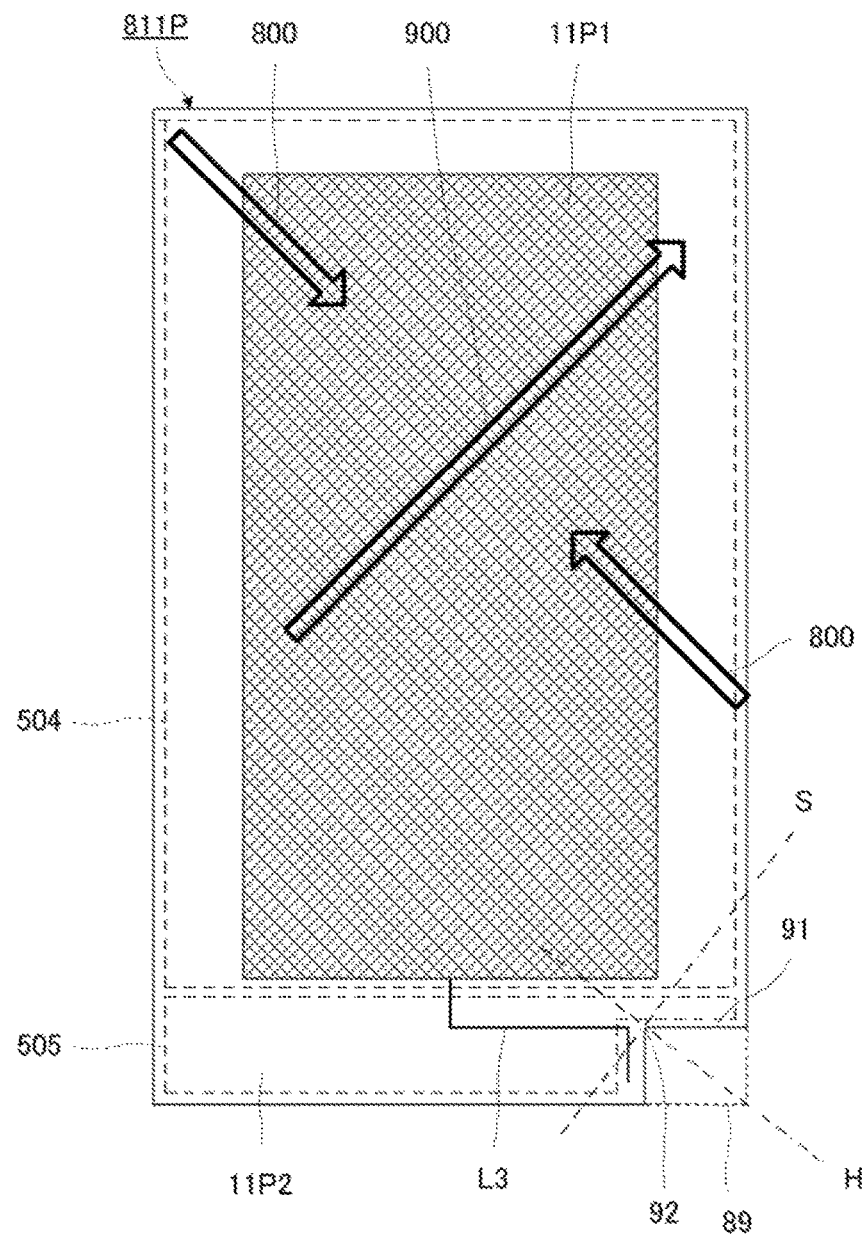
FIG. 20 is a plan view of a piezoelectric film 11P2 of a piezoelectric sensor 811P according to a fifth modified example of the embodiment of the present invention.

Further, as illustrated in FIG. 20, it is also preferable to apply a pressure sensitive adhesive of a low modulus to a first coated area 505 surrounding the cutout portion 89 and apply a pressure sensitive adhesive of a high modulus to a second coated area 504 other than the first coated area 505. Consequently, a piezoelectric sensor 811P can reduce a load to be applied to the cutout portion 89. Consequently, the piezoelectric sensor 811P can further reduce a crack to be produced in the piezoelectric film 11P.

Lastly, it should be understood that description of the embodiment is exemplary in all aspects, and is non-restrictive. The scope of the present invention is represented by the claims not by the above embodiment. Further, the scope of the present invention intends to include meanings equal to the claims and all changes made within the scope of the invention.

DESCRIPTION OF REFERENCE SYMBOLS

C: CRACK
H: NORMAL DIRECTION
S: TANGENTIAL DIRECTION
L1, L2, L3, L4: WIRE
1: DISPLAY DEVICE
10: TOUCH PANEL
11D: CAPACITIVE SENSOR
11D1: CAPACITANCE DETECTION ELECTRODE
11D2: INSULATING SUBSTRATE
11D3: CAPACITANCE DETECTION ELECTRODE
11D4: INSULATING SUBSTRATE
11P: PIEZOELECTRIC SENSOR
11P1: PRESS DETECTION ELECTRODE
11P2: PIEZOELECTRIC FILM
11P3: PRESS DETECTION ELECTRODE
11P4: INSULATING SUBSTRATE
20: CONTROL UNIT
21: STORAGE UNIT
22: RAM
30: DISPLAY UNIT
52: CONTROL CIRCUIT MODULE
60: WIRELESS LAN COMMUNICATION UNIT
61: COMMUNICATION UNIT
70: BATTERY
80: CONNECTION TERMINAL
89: CUTOUT PORTION
91: RIM
92: INNER CORNER
100: HOUSING
101: OPERATION SURFACE
110: OPERATION PLATE
111D4: INSULATING SUBSTRATE
111P: PIEZOELECTRIC SENSOR
111P2: PIEZOELECTRIC FILM
111P4: INSULATING SUBSTRATE
186: CUTOUT PORTION
191, 192: INNER CORNER
211P: PIEZOELECTRIC SENSOR
211P2: PIEZOELECTRIC FILM
289: CUTOUT PORTION
291: RIM
292: INNER CORNER
301: LIQUID CRYSTAL PANEL
302: TOP SURFACE POLARIZING PLATE
303: BACK SURFACE POLARIZING PLATE
304: BACKLIGHT
311P: PIEZOELECTRIC SENSOR
311P2: PIEZOELECTRIC FILM
391: RIM
392: INNER CORNER
411P: PIEZOELECTRIC SENSOR
411P2: PIEZOELECTRIC FILM
489: CUTOUT PORTION
491: RIM
492: INNER CORNER
501~505: COATED AREA
511P, 611P, 711P, 811P: PIEZOELECTRIC SENSOR
800, 801, 805: HIGH SHRINKAGE DIRECTION
900, 901, 905: UNIAXIAL STRETCHING DIRECTION

The invention claimed is:

1. A piezoelectric sensor comprising:
a piezoelectric film having a first principal surface and a second principal surface opposing the first principal surface, the first principal surface having a first edge;
a first conductor pattern on the first principal surface, the first conductor pattern having a lead out electrode extending to a position adjacent the first edge;
a substrate having a third principal surface and a fourth principal surface opposing the third principal surface, the third principal surface having a second edge, the third principal surface being attached to the second principal surface of the piezoelectric film in such a manner that the second edge overlaps the first edge; and
a second conductor pattern on the third principal surface, the second conductor pattern having a lead out electrode extending to a position adjacent the second edge; wherein
the piezoelectric film defines a cutout portion adjacent the first edge through which at least part of the second conductor pattern is exposed.

2. The piezoelectric sensor according to claim 1, wherein the piezoelectric film comprises a chiral polymer.

3. The piezoelectric sensor according to claim 2, wherein the chiral polymer is polylactic acid.

4. The piezoelectric sensor according to claim 3, wherein the polylactic acid is poly-L-lactic acid.

5. A touch panel comprising:
a piezoelectric sensor according to claim 1; and
a touch sensor attached to the piezoelectric sensor and constructed to detect a position of an input on an operation surface thereof.

6. The piezoelectric sensor according to claim 1, wherein the cutout portion has first and second sides meeting at a corner and defining two adjacent sides of an imaginary quadrilateral, the quadrilateral having a diagonal running through the corner in a direction which is not parallel to the uniaxial stretching direction of the piezoelectric film.

7. The piezoelectric sensor according to claim 6, wherein an angle difference between the diagonal and the uniaxial stretching direction is between 45° and 90°.

8. The piezoelectric sensor according to claim 6, wherein the diagonal is not parallel to a direction in which the piezoelectric film experiences a largest amount of shrinkage when heated.

9. The piezoelectric sensor according to claim 8, wherein an angle difference between the diagonal and the direction in which the piezoelectric film experiences the largest amount of shrinkage when heated is between 45° and 90°.

10. The piezoelectric sensor according to claim 6, wherein the corner has a radiused shape.

11. A piezoelectric sensor comprising:
a piezoelectric film having a first principal surface and a second principal surface opposing the first principal surface;
a first conductor pattern on the first principal surface;
a substrate having a third principal surface and a fourth principal surface opposing the third principal surface, the third principal surface being attached to the second principal surface of the piezoelectric film; and
a second conductor pattern on the third principal surface, wherein:
the piezoelectric film defines a cutout portion through which at least part of the second conductor pattern is exposed, the cutout portion having first and second sides meeting at a corner and defining two adjacent sides of an imaginary quadrilateral, the quadrilateral having a diagonal running through the corner in a direction which is not normal to a direction in which the piezoelectric film experiences a largest amount of shrinkage when heated.

12. The piezoelectric sensor according to claim 11, wherein an angle difference between the diagonal and the direction in which the piezoelectric film experiences the largest amount of shrinkage when heated is between 45 and 90°.

13. The piezoelectric sensor according to claim 11, wherein the corner has a radiused shape.

14. The piezoelectric sensor according to claim 11, wherein the piezoelectric film comprises a chiral polymer.

15. The piezoelectric sensor according to claim 14, wherein the chiral polymer is polylactic acid.

16. The piezoelectric sensor according to claim 15, wherein the polylactic acid is poly-L-lactic acid.

17. A touch panel comprising:
  a piezoelectric sensor according to claim 11; and
  a touch sensor attached to the piezoelectric sensor and constructed to detect a position of an input on an operation surface thereof.

18. A piezoelectric sensor comprising:
  a piezoelectric film having a first principal surface and a second principal surface opposing the first principal surface;
  a first conductor pattern on the first principal surface;
  a substrate having a third principal surface and a fourth principal surface opposing the third principal surface, the third principal surface being attached to the second principal surface of the piezoelectric film; and
  a second conductor pattern on the third principal surface;
  the piezoelectric film defining a cutout portion through which at least part of the second conductor pattern is exposed, the cutout portion having first and second sides meeting at a corner and defining two adjacent sides of an imaginary quadrilateral, the quadrilateral having a diagonal running through the corner in a direction which is not parallel to the uniaxial stretching direction of the piezoelectric film.

19. The piezoelectric sensor according to claim 18, wherein an angle difference between the diagonal and the uniaxial stretching direction is between 45° and 90°.

20. A touch panel comprising:
  a piezoelectric sensor according to claim 18; and
  a touch sensor attached to the piezoelectric sensor and constructed to detect a position of an input on an operation surface thereof.

* * * * *